(12) United States Patent
Kirkland et al.

(10) Patent No.: US 7,250,938 B2
(45) Date of Patent: Jul. 31, 2007

(54) SYSTEM AND METHOD FOR IMPROVED USER INPUT ON PERSONAL COMPUTING DEVICES

(75) Inventors: Dustin C. Kirkland, Austin, TX (US); David Bruce Kumhyr, Austin, TX (US); Emily Jane Ratliff, Austin, TX (US); Kylene Jo Smith, Austin, TX (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 604 days.

(21) Appl. No.: 10/752,405

(22) Filed: Jan. 6, 2004

(65) Prior Publication Data

US 2005/0146508 A1  Jul. 7, 2005

(51) Int. Cl.
*G09G 5/00* (2006.01)
(52) U.S. Cl. .................. 345/168; 345/156
(58) Field of Classification Search ........ 345/156–173, 345/179; 715/773, 863, 864, 532, 533, 541
See application file for complete search history.

(56) References Cited

U.S. PATENT DOCUMENTS

| 5,454,046 | A |   | 9/1995 | Carman, II | 382/186 |
|---|---|---|---|---|---|
| 5,596,656 | A |   | 1/1997 | Goldberg | 382/186 |
| 6,094,197 | A | * | 7/2000 | Buxton et al. | 715/863 |
| 6,121,960 | A |   | 9/2000 | Carroll et al. | 345/173 |
| 7,098,896 | B2 | * | 8/2006 | Kushler et al. | 345/168 |
| 2006/0055669 | A1 | * | 3/2006 | Das | 345/156 |

FOREIGN PATENT DOCUMENTS

| GB | 2380583 | 4/2003 |
|---|---|---|
| JP | 06-195164 | 7/1994 |
| JP | 2004-530999 | 10/2004 |

* cited by examiner

*Primary Examiner*—Nitin I. Patel
(74) *Attorney, Agent, or Firm*—Duke W. Yee; Scott W. Reid; Gerald H. Glanzman

(57) ABSTRACT

A user input mechanism is provided that allows a user to enter words as gestures on a virtual keyboard presented on the display device. The user input mechanism combines two existing and prevalent forms of user input: cursive handwriting and keyboard input. A familiar keyboard layout is presented on the display. A user then may place an implement, such as a stylus or the user's finger, in contact with the display. Typically, the implement will first touch the screen at a position of a first character in a word. The user then may move the implement along the surface of the display from character to character, spelling out a word.

21 Claims, 6 Drawing Sheets

SYSTEM AND METHOD FOR IMPROVED USER INPUT ON PERSONAL COMPUTING DEVICES

BACKGROUND OF THE INVENTION

1. Technical Field

The present invention relates to data processing systems and, in particular, to personal computing devices. Still more particularly, the present invention provides a method, apparatus, and program for improved user input on personal computing devices.

2. Description of Related Art

Mobile computing devices, such as mobile phones, handheld computers, and personal digital assistants, are now ubiquitous in today's society. These devices now typically have processors, memory, and storage that provide users with computing power nearly on par with that of desktop computers. Many users find, however, that the primary drawback of such devices is that of the input mechanisms. Manual entry of any significant amount of data into a mobile phone or personal digital assistant (PDA) is certainly a non-trivial task.

Text input is typically accomplished by one of three input mechanisms. A first text input mechanism is a hardware key mechanism. Mobile phones usually have a numeric keypad with which users may enter textual characters using combinations of button presses. This method of input is slow and cumbersome, since the task of entering a long string of text requires a considerable number of button presses. Other mobile computing devices include a full keyboard. However, with the small size of the device itself, the size and spacing of the keys renders the keyboard difficult to manipulate.

Many mobile computing devices include a touch screen display device and a stylus that may be used to manipulate graphical elements on the display. Some attempts have been made to allow users to use handwritten characters on the touch screen display with varying degrees of success. Graffiti® is a handwriting recognition mechanism that recognizes simplified gestures for textual characters. Still, the user must write individual characters and the recognition mechanism has limited success.

Some mobile computing devices provide a "virtual" keyboard that presents a miniature version of a keyboard on a touch screen. The user may then use keyboard layout to tap the virtual keys to enter text. However, tapping the keys remains a tedious hunt-and-tap operation using a stylus, which is not as natural as two-handed typing on a full size keyboard. Furthermore, the user must successfully depress each key individually by tapping with the stylus. This operation is tedious and difficult for many users.

SUMMARY OF THE INVENTION

The present invention recognizes the disadvantages of the prior art and provides an improved user input mechanism for personal computing devices. The user input mechanism recognizes when an implement, such as a stylus or a user's finger, makes contact with a touch sensitive input device. Preferably, a virtual keyboard is displayed under the input device. The user input mechanism then recognizes movement of the implement while in contact with the touch screen. The user input mechanism may recognize known patterns or gestures that correspond to words as they relate spatially to the placement of keys on the virtual keyboard. The word may be completed by lifting the implement from the keyboard, by dragging the implement off the keyboard area, or by tapping a designated area. Alternatively, the user input mechanism may recognize changes of direction and other movements within the pattern that identify characters in the word. The user input mechanism may then perform a spell check or context analysis to determine a closest match for the pattern or gesture.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
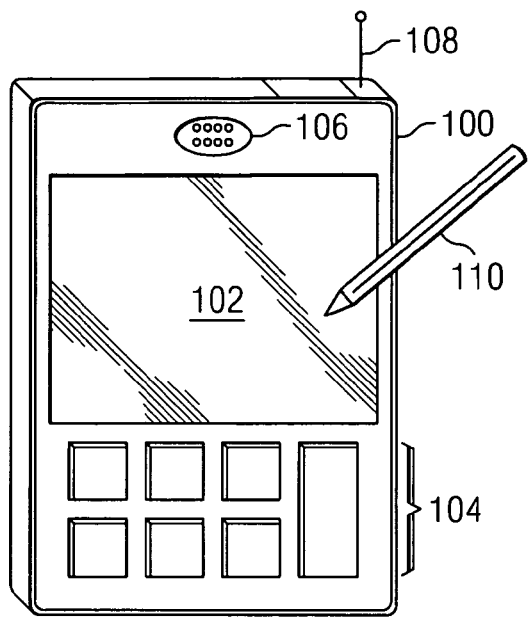
FIG. 1 is a diagram of a personal computing device in accordance with a preferred embodiment of the present invention.

With reference now to FIG. 1, a simplified diagram of a personal computing device is depicted in accordance with a preferred embodiment of the present invention. Personal computing device 100 includes a display 102 for presenting textual and graphical information. Display 102 may be a known display device, such as a liquid crystal display (LCD) device. The display may be used to present a map or directions, calendar information, a telephone directory, or an electronic mail message. In an exemplary embodiment of the present invention, screen 102 may be a touch screen device that receives user input using an implement such as, for example, stylus 110.

Personal computing device 100 may also include keypad 104, speaker 106, and antenna 108. Keypad 104 may be used to receive user input in addition to using screen 102. Speaker 106 provides a mechanism for audio output, such as presentation of an audio file. Antenna 108 provides a mechanism used in establishing a wireless communications link between personal computing device 100 and a network. Associated device drivers and wireless communications means are not explicitly shown in FIG. 1.

Personal computing device 100 also preferably includes a graphical user interface that may be implemented by means of systems software residing in computer readable media in operation within personal computing device 100.

In accordance with a preferred embodiment of the present invention, a user input mechanism is provided that allows a user to enter words as gestures on a virtual keyboard presented on the display device. The user input mechanism of the present invention combines elements of two existing and prevalent forms of user input: cursive handwriting and keyboard input. A familiar keyboard layout is presented on the display. A user then may place an implement, such as a stylus or the user's finger, in contact with the display. Typically, the implement will first touch the screen at a position of a first character in a word. The user then may move the implement along the surface of the display from character to character, spelling out a word. In time, the user will learn the patterns on the virtual keyboard for each word. With even greater familiarity, the display of the virtual keyboard may become superfluous for expert users.

Figure 2:
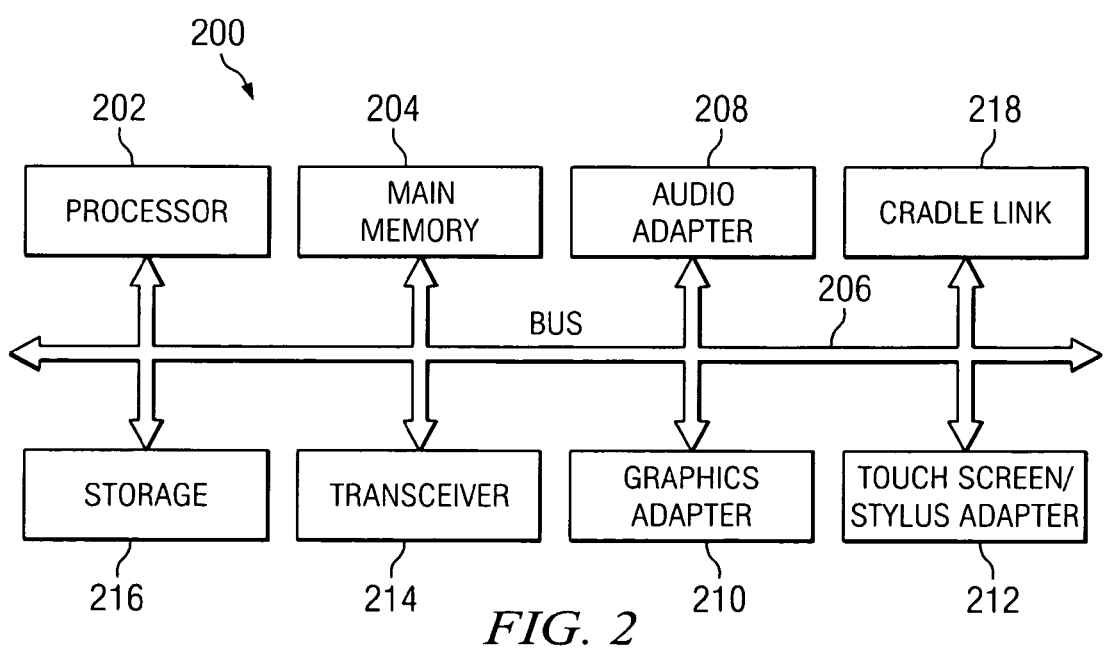
FIG. 2 is a block diagram of a personal computing device in accordance with a preferred embodiment of the present invention.

Turning now to FIG. 2, a block diagram of a personal computing device is shown in accordance with a preferred embodiment of the present invention. Personal computing device 200 is an example of a computing device, such as personal computing device 100 in FIG. 1, in which code or instructions implementing the processes of the present invention may be located. Personal computing device 200 includes a bus 206 to which processor 202 and main memory 204 are connected. Audio adapter 208, graphics adapter 210, touch screen/stylus adapter 212, transceiver 214, and storage 216 also are connected to bus 206.

Cradle link 218 provides a mechanism to connect personal computing device 200 to a cradle used in synchronizing data in personal computing device 200 with another data processing system. Further, touch screen/stylus adapter 212 also includes a mechanism to receive user input as a stylus makes contact with a touch screen display.

An operating system runs on processor 202 and is used to coordinate and provide control of various components within personal computing device 200 in FIG. 2. The operating system may be, for example, a commercially available operating system such as Windows CE, which is available from Microsoft Corporation, Linux, or PalmOS. Instructions for the operating system and applications or programs are located on storage devices, such as storage 216, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Personal computing device 200 may be, for example, a personal digital assistant (PDA) or a palm-top computing device. Personal computing device 200 may also take the form of a telephone computing device, a tablet computer, or a laptop computer within the scope of the present invention.

Figure 3:
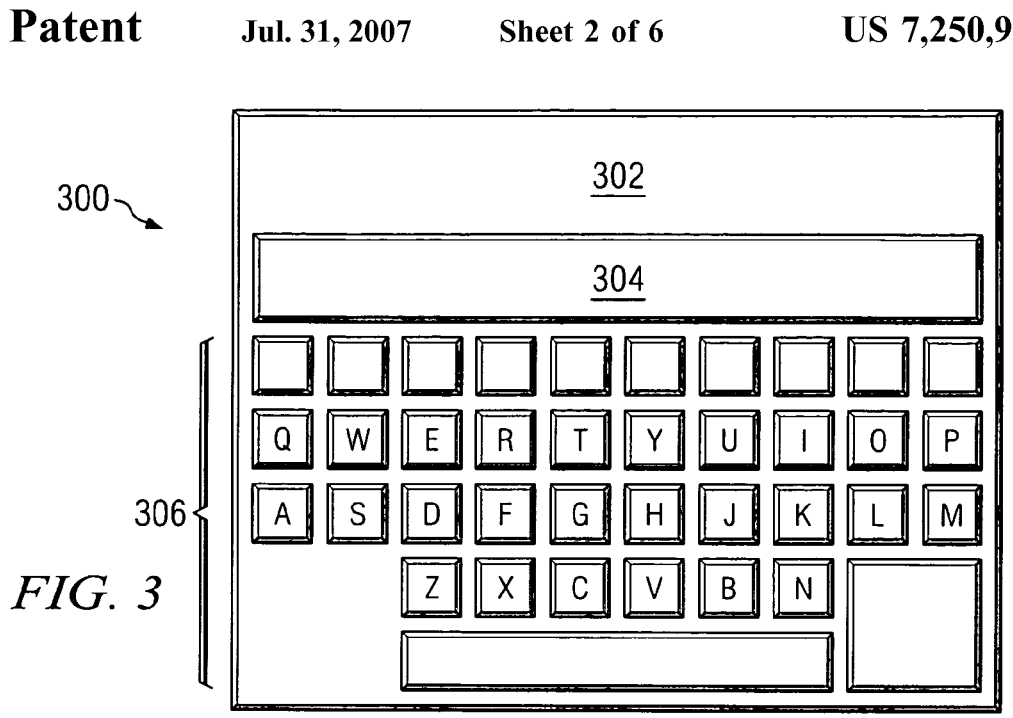
FIG. 3 illustrates a touch screen display in accordance with a preferred embodiment of the present invention.

FIG. 3 illustrates a touch screen display in accordance with a preferred embodiment of the present invention. Touch screen display 300 includes an application portion 302, a text input portion 304, and a virtual keyboard 306. In the depicted example, the keyboard layout is similar to a QWERTY keyboard layout. A QWERTY keyboard layout is named after the order of the keys in the upper left portion of the keyboard. Other keyboard layouts, such as the Dvorak keyboard layout, may also be used within the scope of the present invention. The present invention may also apply to other input layouts, such as a numeric keypad or a non-English alphabetic keyboard. Therefore, a word may consist of a string of alphabetic characters, a string of numeric characters, or a combination of alphabetic and numeric characters.

Tapping individual letters on a virtual keyboard is not a natural operation for most users. Holding a stylus is similar to holding a pen or pencil; therefore, users find handwriting more natural with a stylus. When writing with a pen or pencil, cursive writing is a more efficient and fluid style of writing. A user is able to write words more efficiently, because the writing implement leaves the paper less frequently.

The present invention provides a "QWER-sive" user input mechanism that recognizes gestures that represent words. QWER-sive, pronounced like "cursive," is an input method that allows users to enter words as a single gesture based on a keyboard layout, such as virtual keyboard 306. A user places an implement, such as a stylus for example, in contact with the touch screen over a display of a first letter of a word. The user then drags the stylus, while in contact with the surface of the touch screen, to the next letter of the word, then to the next letter, and so on. The user may then use the keyboard layout to fluidly write whole words in a single gesture. Using the QWER-sive input mechanism of the present invention, the time between each character entry is minimized and users may eventually be able to repeat gestures from memorization of commonly used words or character combinations.

As words are recognized from input on keyboard layout 306, the words are presented in text input portion 304. If a word or series of words is accepted, the string is sent to an application in application portion 302. In this manner, the user may efficiently and fluidly enter text into a personal computing device.

While the example depicted in FIG. 3 shows a keyboard layout on the display, a user may become increasingly familiar with the keyboard layout and may also memorize gestures for particular words. A large percentage of text in most languages may be represented by a relatively small subset of words. For example, the words "the," "is," "it," and "of" are examples of very common words in the English language. A user may memorize the gestures for very common words and execute them without looking at the keyboard layout. The patterns of the gestures may be recognized as loosely tied to the keyboard layout. In fact, for many words, it may not be necessary to display the keyboard layout. Thus, in an exemplary embodiment of the present invention, gestures may be entered relative to a keyboard layout that is not displayed. The keyboard layout may be displayed only when expressly requested by the user by selection of a particular button or graphical element, for example.

Figure 4A:
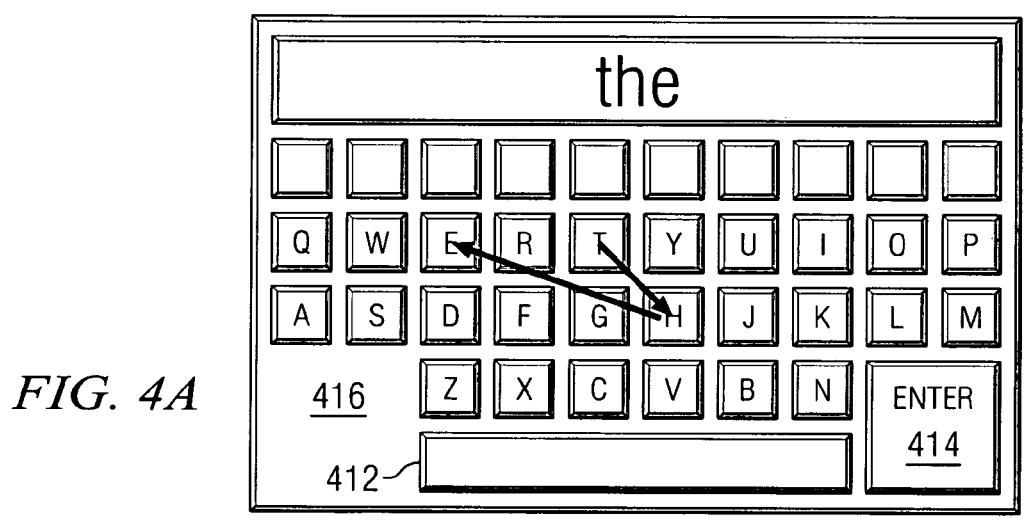
FIGS. 4A-4F illustrate example text entry using the user input mechanism of the present invention.

FIGS. 4A-4F illustrate example text entry using the user input mechanism of the present invention. More particularly, FIG. 4A illustrates the entry of a common word, "the." The user places an implement in contact with a virtual keyboard the location of the first letter, in this case "t." The user then drags the implement from the "t" to the location of the letter "h" and then to the letter "e." The user may then end the word by simply lifting the implement from the surface of the touch screen or by, for example, dragging the implement to space bar 412, dragging the implement to "ENTER" key 414, or dragging the implement to an unused portion of the display, such as portion 416.

The input mechanism of the present invention may use fuzzy logic to determine keys that are close to vertices of gestures. For example, given the above example of the word "the," users may perform the change of direction associated with the letter "h" with varying degrees of fluidity and accuracy. Rather than executing a sharp change of direction with a vertex directly on the "h" key, a user may round the corner or stop at the edge of the virtual key. Thus, the present invention may include some fuzzy logic to more accurately determine the intentions of the user.

Figure 4B:
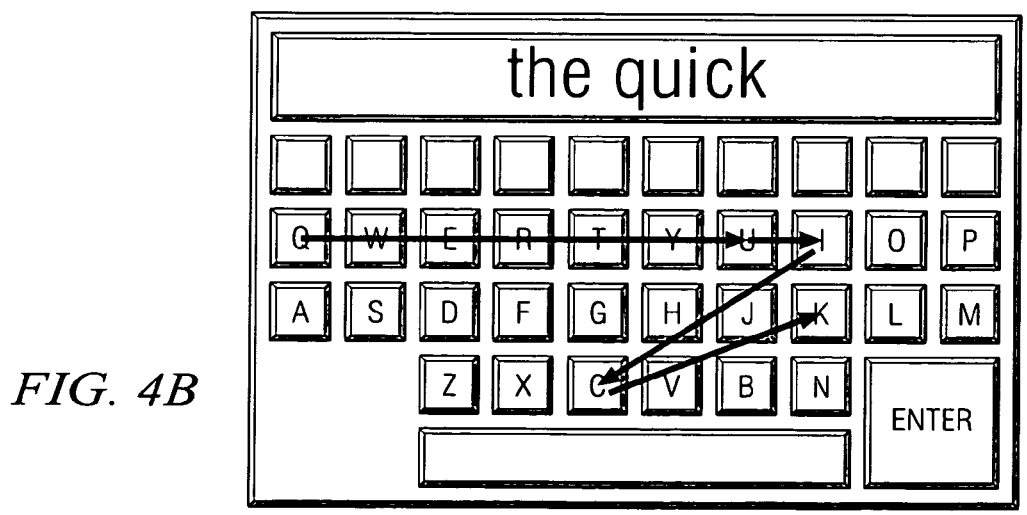

FIG. 4B illustrates the entry of the word "quick." In this case, the user must pass through the letter "u" to get to the letter "i." The user input mechanism of the present invention may recognize the letter "u" by determining whether the stylus stops momentarily at the location of the letter "u" on the keyboard layout.

Alternatively, the user may simply pass through the letter, thus forming a gesture for the word "qick." In this case, the user input mechanism may recognize the pattern as a common pattern corresponding to the word "quick." The user input mechanism may also accept "qick" as the input word and perform a spell check operation, which may determine that the word "quick" is a closest match for the input word. Another method for identifying letters that lie on a path between preceding and succeeding letters in the keyboard layout is described below with reference to FIG. 4F.

Figure 4C:
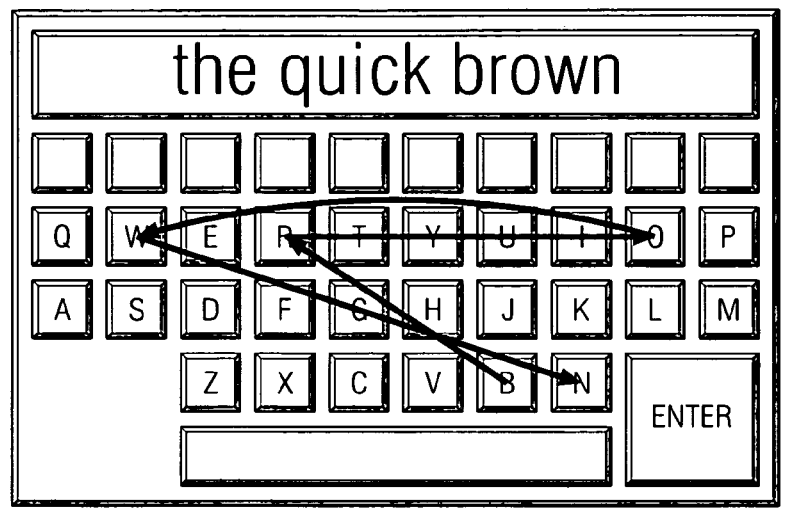
Figure 4D:
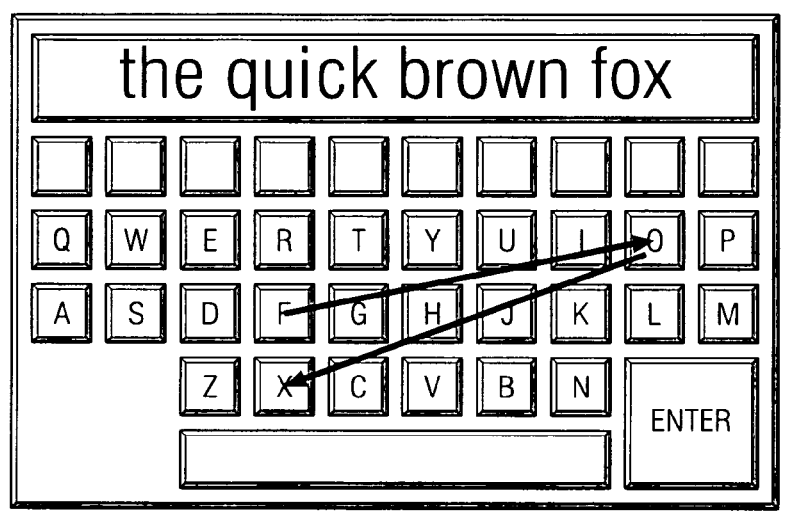

FIG. 4C illustrates the entry of the word "brown" using the user input mechanism of the present invention. Further, FIG. 4D illustrates the entry of the word "fox." As each word is completed by, for example, lifting the implement from the surface of the touch screen, the word is added to the text input portion of the display. Alternatively, the user input mechanism may display individual characters as the implement changes directions or makes other sub-gestures within the gesture. The user input mechanism may also make guesses as to what word is being input based upon individual characters or the pattern as a whole in a manner similar to a conventional autocomplete function known in the art. If a guess is correct, the user may halt entry and indicate acceptance of the guess by, for example, tapping the "ENTER" key or the like.

Figure 4E:
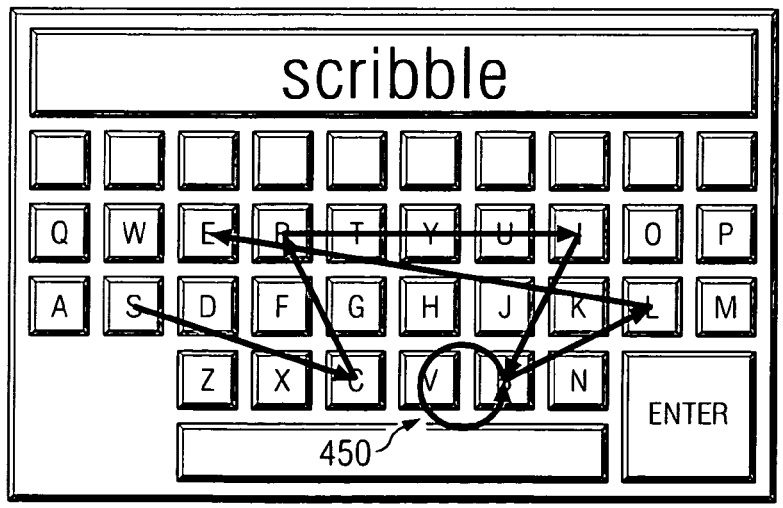

With reference now to FIG. 4E, the entry of a word with a double letter is shown. In this example, the word "scribble" has a double "b" in the word. As stated above, the user may enter only one "b" with the expectation that the user input mechanism will recognize the pattern or correct the spelling with a spell check. However, in accordance with a preferred embodiment of the present invention, the user may explicitly enter a double letter with a sub-gesture. In this example, loop sub-gesture 450 may indicate a double letter. The user enters the letters until a letter occurs twice in succession. The user then may loop from the first occurrence to a second occurrence in a circular gesture to indicate a double letter.

Figure 4F:
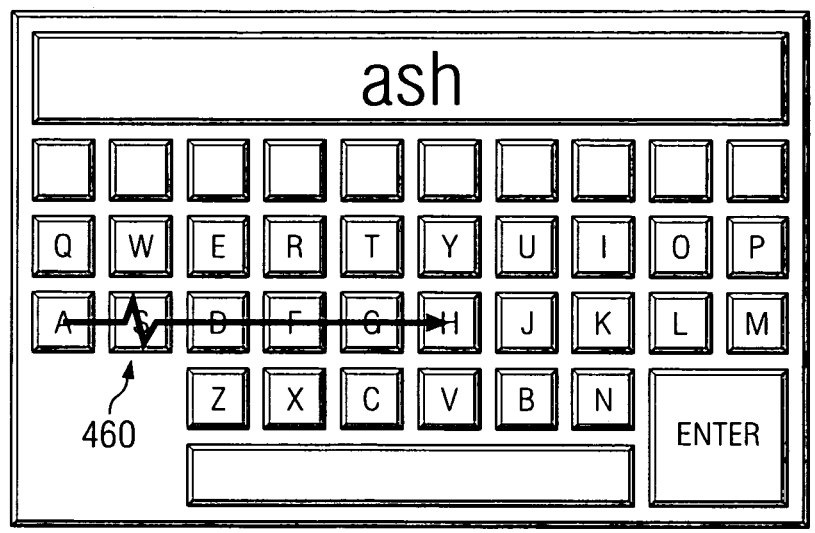

FIG. 4F illustrates the entry of a word in which letters appear in a straight line. In this example, the word "ash" is entered by dragging the stylus from the letter "a" through the letter "s" to the letter "h." As stated above, the user may drag through the letter "s" with the expectation that the user input mechanism will recognize the pattern or correct the spelling with a spell check. However, in accordance with a preferred embodiment of the present invention, the user may explicitly enter the letter "s" with a sub-gesture. In this example, tick or heart beat sub-gesture 460 may indicate that a letter is to be included in the word. The user enters the letter "a" and drags to the letter "s" and performs a up-and-down motion with the implement to indicate that the letter "s" is part of the word. Then, the user drags to the final letter "h."

While a "tick" or "heartbeat" type sub-gesture is shown in FIG. 4F, other sub-gestures may also be used. For instance, since the letter "s" would not typically be included in a gesture from "a" to "h," in the depicted example, a "loop" sub-gesture may be used to indicate inclusion of the letter "s." In this case, a double loop sub-gesture may be used to indicate double letters that lie between preceding and succeeding letters in the keyboard layout.

Other sub-gestures may be used within the scope of the present invention. For example, alternative sub-gestures, such as "hump" or "V" like sub-gesture, may be used for a double letter or "drag-through" letter. Sub-gestures may also be used to indicate character modifications, such as capitalization and the like. Other character modifications and sub-gestures may be apparent to those of ordinary skill in the art.

Figure 5:
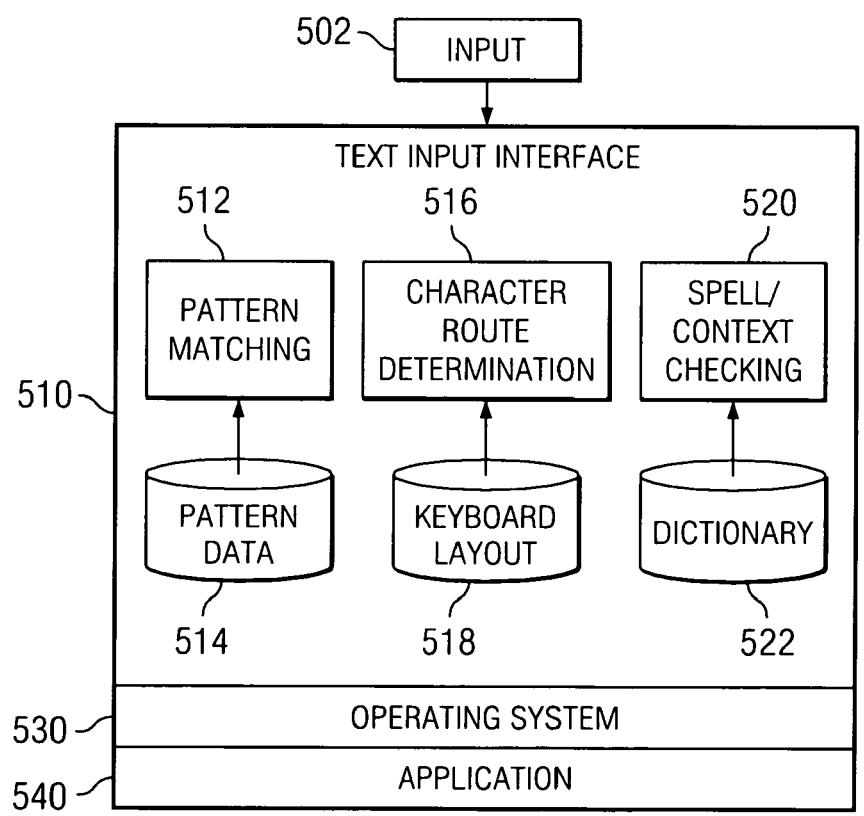
FIG. 5 is a block diagram illustrating a data processing system in accordance with an exemplary embodiment of the present invention.

FIG. 5 is a block diagram illustrating a data processing system in accordance with an exemplary embodiment of the present invention. Text input interface 510 receives user input 502. In an exemplary embodiment, user input 502 is generated by placing a stylus or other implement in contact with a touch screen device. Text input interface provides text to operating system 530 and ultimately to application 540 running in the operating environment of operating system 530.

Input 502 includes gestures made by dragging an implement over a virtual keyboard displayed on a touch screen. Text input interface 510 includes pattern matching 512, which compares the gesture to pattern data 514. The pattern data associates common words with their corresponding patterns. If the input gesture matches a known pattern, the input word is identified as the word associated with the pattern. In this manner, a user may memorize common patterns and quickly draw them on the touch screen without having to pay close attention to the individual letters.

Text input interface 510 also includes character route determination 516, which recognizes changes of direction and sub-gestures within the gesture to identify individual letters within the word. Character route determination 516 may compare input positions with respect to the touch screen with keyboard layout information 518 to determine individual characters associated with changes of direction and sub-gestures.

Text input interface 510 may also include spell/context checking 520, which looks up input words in dictionary 522. Incorrectly spelled words, both intentional and unintentional, may be corrected by replacing them with words from dictionary 522. Considering the previous example of "qick," the word "quick" may be found to be the closest match in dictionary 522. The text input interface may automatically correct the word or prompt the user for acceptance of the corrected word.

Spell/context checking 520 may also apply rules to correct a word. For example, in entering a longer word, the user may unintentionally lift the implement from the screen. Spell/context checking may apply a rule to combine the two word fragments and look the resulting word up in dictionary 522. As a specific example, the user may unintentionally enter "mischara" and "cterization." While neither word fragment is likely to be found in the dictionary, the combined word of "mischaracterization" may be found. Context rules may also be applied to identify words that are commonly entered by a given user. For example, user may use a particular word frequently and enter the gesture quickly. Spell/context checking 520 may recognize the word based on the context and frequency of the gesture.

Text input interface 510 may be embodied within a device driver for a touch screen device. The text input interface may also be embodied within operating system 530 or may be an application that runs on top of or within the operating system, providing text input to application 540. As such, the text input interface may be added as a terminate and stay resident (TSR) application that filters user input to provide quick and efficient textual input using word gestures.

Figure 6A:
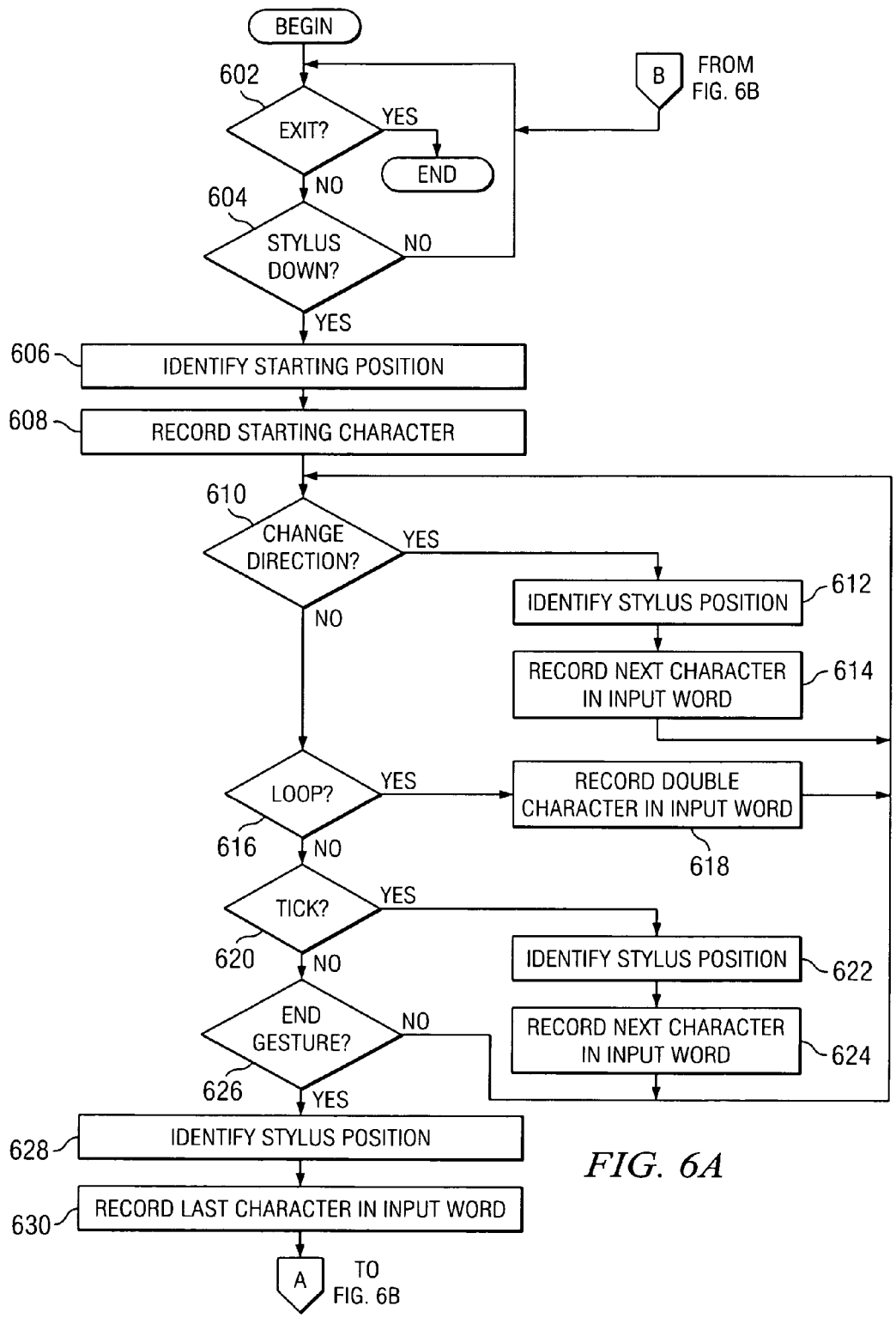
FIGS. 6A and 6B depict a flowchart illustrating the operation of a user input interface in accordance with an exemplary embodiment of the present invention.
Figure 6B:
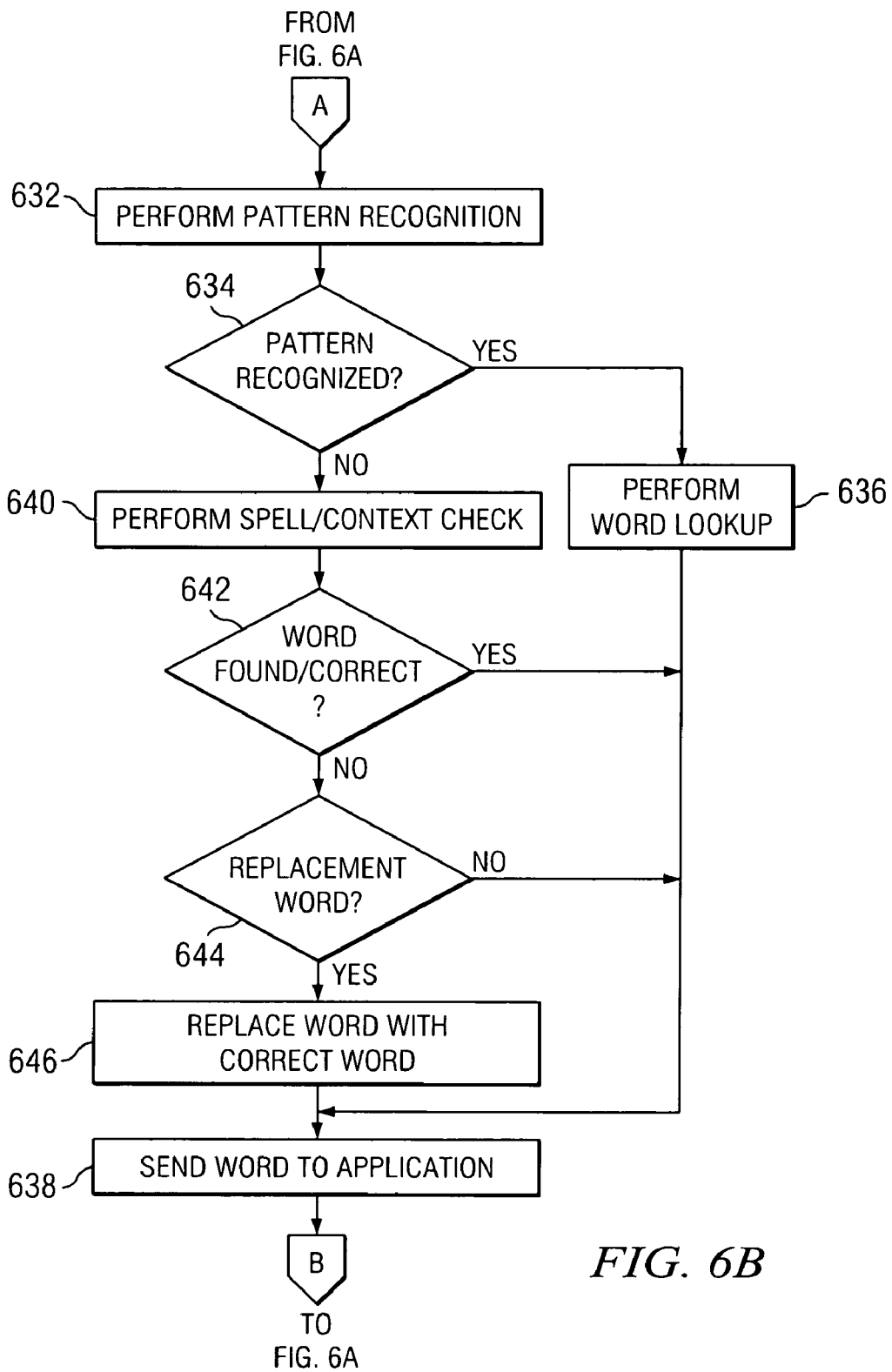

FIGS. 6A and 6B depict a flowchart illustrating the operation of a user input interface in accordance with an exemplary embodiment of the present invention. With reference to FIG. 6A, the process begins and a determination is made as to whether an exit condition exists (step 602). An exit condition may exist, for example, when the personal computing device is shut down, when the user exits the user input interface, when the user switches to an alternate input interface, etc. If an exit condition exists, the process ends.

If an exit condition does not exist in step 602, a determination is made as to whether the stylus is down or in contact with the touch screen (step 604). If the stylus is not down, the process returns to step 602 to determine whether an exit condition exists. If, however, the stylus is in contact with the touch screen in step 604, the process identifies the starting position of the stylus (step 606) and records the starting character of the word (step 608).

Then, a determination is made as to whether a change of direction occurs (step 610). If a change of direction occurs while the stylus remains in contact with the touch screen, the process identifies the stylus position (step 612) and records the next character in the input word based on the stylus position (step 614). Thereafter, the process returns to step 610 to determine whether a change of direction occurs.

If a change of direction does not occur in step 610, a determination is made as to whether a loop sub-gesture occurs (step 616). If a loop sub-gesture occurs, the process records a double character in the input word based on the last character entered (step 618) and returns to step 610 to determine whether a change of direction occurs.

If a loop sub-gesture does not occur in step 616, a determination is made as to whether a tick sub-gesture occurs while the stylus is in contact with the touch screen (step 620). If a tick sub-gesture occurs, the process identifies the stylus position (step 622) and records the next character in the input word based on the stylus position (step 624). Thereafter, the process returns to step 610 to determine whether a change of direction occurs.

If a tick sub-gesture does not occur in step 620, a determination is made as to whether gesture ends (step 626). This determination may be made, for example, by determining whether the stylus is lifted from the touch screen or whether the stylus is dragged to a space bar an enter key or any other control or unused portion of the touch screen. If the gesture ends, the process identifies the stylus position (step 628) and records the last character in the input word based on the stylus position (step 630).

The process shown in FIG. 6A may be modified to include additional sub-gestures. For example, a sub-gesture for capitalization may be added to the process. Other character modifications or special characters may also be handled through the use of sub-gestures in a manner similar to that shown in FIG. 6A.

Next, continuing to FIG. 6B, the process performs pattern recognition on the input gesture (step 632). Pattern matching may be mostly based on changes of direction and sub-gestures. Sub-gestures may also be considered changes of direction. A determination is made as to whether the pattern is recognized (step 634). If the pattern is recognized, the process performs word lookup based on the pattern (step 636) and sends the associated word to a selected application (step 638).

If the pattern is not recognized in step 634, the process performs spell/context check (step 640). A determination is made as to whether the word is found or is correct based on the context (step 642). If the word is found in a dictionary or is correct based on the context, the process continues to step 630 to send the word associated with the gesture to a selected application (step 638).

If the words not found or correct based on the context in step 642, a determination is made as to whether a replacement word is identified (step 644). This determination may be made by automatically identifying a replacement word or by prompting the user for selection of the correct word. If a replacement word is not identified, the word is sent to the selected application as entered (step 638). If a replacement word is identified, the process replaces the input word with the replacement word (step 646) and the replacement word is sent to the selected application (step 638).

After the process sends the word associated with the gesture to the application in step 638, the process returns to step 602 in FIG. 6A to determine whether an exit condition exists.

Thus, the present invention solves the disadvantages of the present invention by providing a user input mechanism that allows a user to efficiently enter strings of text using a virtual keyboard without having to execute repetitive and tedious operations. The user input mechanism of the present invention recognizes gestures that represent multiple character words. The user is able to fluidly write words as a single gesture in a natural manner that is similar to cursive handwriting. Since the user input mechanism of the present invention is based on a familiar keyboard layout and is gesture-based, the user can easily learn the gestures and enter them efficiently from memory. The patterns of the gestures may be recognized as loosely tied to the keyboard layout. Thus, the user may enter them quickly without paying close attention to the actual layout.

The present invention may also be applied to any situation where the user may prefer the QWER-sive input mechanism over other text input mechanisms. For example, a desktop computer user may prefer to use the QWER-sive mechanism with a touch screen input device, such as a touch pad, over keyboard input. A user may also prefer the QWER-sive input mechanism of the present invention, because the user may enter text with one hand, leaving the other hand free for other more productive activities, such as holding a telephone or printed materials. For example, a laptop computer user on an airplane may enter text with one hand while holding a report or memorandum with the other hand.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for user input, the method comprising:
   receiving a user input, wherein the user input includes a gesture that represents a plurality of characters and wherein a shape of the gesture is related to positions of the plurality of characters within a keyboard layout;
   identifying a string of characters associated with the gesture; and
   providing the identified string as text input.

2. The method of claim 1, wherein identifying a string associated with the gesture includes performing pattern recognition on the gesture.

3. The method of claim 1, wherein identifying a string associated with the gesture includes:
   identifying a starting position; and
   recording a character based on the starting position with respect to the keyboard layout.

4. The method of claim 1, wherein identifying a string associated with the gesture includes:
   identifying a change of direction; and
   recording a character based on a position of the change of direction with respect to the keyboard layout.

5. The method of claim 1, further comprising:
   performing a spell check on the identified string.

6. The method of claim 1, wherein providing the identified string as input includes providing the identified string to an application.

7. The method of claim 1, wherein the gesture maintains a contact with a touch sensitive device while moving to each of the positions of the plurality of characters corresponding to the keyboard layout.

8. A method for user input, the method comprising:
   receiving a user input, wherein the user input includes a gesture that represents a plurality of characters and wherein a shape of the gesture is related to positions of the plurality of characters within a keyboard layout;
   identifying a string of characters associated with the gesture, wherein identifying a string associated with the gesture includes:
      identifying a sub-gesture; and
   providing the identified string as text input.

9. The method of claim 8, wherein the sub-gesture indicates a double letter.

10. The method of claim 8, wherein identifying a string associated with the gesture further includes:
    recording a character based on a position of the sub-gesture with respect to the keyboard layout.

11. A method for user input, the method comprising:
    receiving a user input, wherein the user input includes a gesture that represents a plurality of characters and wherein a shape of the gesture is related to positions of the plurality of characters within a keyboard layout;
    identifying a string of characters associated with the gesture;
    providing the identified string as text input; and
    performing a spell check on the identified string, wherein performing a spell check on the identified string includes:
       looking up the identified string in a dictionary;
       determining whether the identified string exists in the dictionary; and
       responsive to the identified string existing in the dictionary, accepting the identified string as input.

12. The method of claim 11, wherein performing a spell check on the identified string further includes:
    responsive to the identified string not existing in the dictionary, identifying a substitute string in the dictionary for the identified string; and
    accepting the substitute string as input.

13. An apparatus for user input; the apparatus comprising:
    receipt means for receiving a user input, wherein the user input includes a gesture that represents a plurality of characters and wherein a shape of the gesture is related to positions of the plurality of characters within a keyboard layout;
    identification means for identifying a string of characters associated with the gesture; and
    providing means for providing the identified string as text input.

14. The apparatus of claim 13, wherein the identification means includes means for performing pattern recognition on the gesture.

15. The apparatus of claim 13, wherein the identification means includes:
    means for identifying a starting position; and
    means for recording a character based on the starting position with respect to the keyboard layout.

16. The apparatus of claim 13, further comprising:
    means for performing a spell check on the identified string.

17. An apparatus for user input, the apparatus comprising:
    receipt means for receiving a user input, wherein the user input includes a gesture that represents a plurality of characters and wherein a shape of the gesture is related to positions of the plurality of characters within a keyboard layout;
    identification means for identifying a string of characters associated with the gesture, wherein the identification means includes:
       means for identifying a change of direction; and
       means for recording a character based on a position of the change of direction with respect to the keyboard layout; and
    providing means for providing the identified string as text input.

18. An apparatus for user input, the apparatus comprising:
    receipt means for receiving a user input, wherein the user input includes a gesture that represents a plurality of characters and wherein a shape of the gesture is related to positions of the plurality of characters within a keyboard layout;
    identification means for identifying a string of characters associated with the gesture, wherein the identification means includes:
       means for identifying a sub-gesture.

19. The apparatus of claim 18, wherein the sub-gesture indicates a double letter.

20. The apparatus of claim 18, wherein the identification means further includes:
    means for recording a character based on a position of the sub-gesture with respect to the keyboard layout.

21. A computer program product for user input, the computer program product comprising:
    instructions for receiving a user input, wherein the user input includes a gesture that represents a plurality of characters and wherein a shape of the gesture is related to positions of the plurality of characters within a keyboard layout;
    instructions for identifying a string of characters associated with the gesture; and
    instructions for providing the identified string as text input.

* * * * *